United States Patent [19]

Mittelmann

[11] 3,895,295

[45] July 15, 1975

[54] WATTSECOND SENSING CIRCUIT

[75] Inventor: Eugene Mittelmann, Chicago, Ill.

[73] Assignee: Illinois Tool Works Inc., Chicago, Ill.

[22] Filed: Mar. 29, 1974

[21] Appl. No.: 456,345

Related U.S. Application Data

[62] Division of Ser. No. 290,227, Sept. 18, 1972, Pat. No. 3,816,690.

[52] U.S. Cl. ................ 324/142; 307/238; 307/246; 307/252 J

[51] Int. Cl.² .................... G01R 07/00; G01R 11/32

[58] Field of Search ............ 324/142; 307/238, 260, 307/246, 252 J, 252 W; 328/78

[56] References Cited

UNITED STATES PATENTS

| | | | |
|---|---|---|---|
| 3,289,064 | 12/1966 | Doyle et al. | 307/260 X |
| 3,787,740 | 1/1974 | Salton et al. | 307/246 X |

*Primary Examiner*—Stanley T. Krawczewicz
*Attorney, Agent, or Firm*—Robert W. Beart; Thomas W. Buckman

[57] ABSTRACT

A wattsecond responsive circuit adapted for coupling to an inductance unit to terminate operation thereof upon sensing a desired predetermined measurement of wattseconds. The circuit is based on the comparison of a charge on a pair of capacitive elements of a different value.

3 Claims, 4 Drawing Figures

WATTSECOND SENSING CIRCUIT

CROSS-REFERENCE TO RELATED APPLICATIONS

This is a division of application Ser. No. 290,227, filed Sept. 18, 1972, now U.S. Pat. No. 3,816,690 which issued June 11, 1974.

BACKGROUND OF THE INVENTION

This invention relates generally to an induction heating apparatus, and more particularly to induction heating apparatus which allows the heater unit to be remotely located from the generator unit.

Induction heating is a relatively well-known expedient for producing heat in localized areas on metal objects by the use of RF power which develops a varying magnetic field within the metal to be heated. The internal energy losses within the material cause it to heat up in a relatively short period of time.

However, one of the primary disadvantages of induction heating units heretofore utilized is that the RF power generator and the induction heating unit, per se, required a fixed geometry relation therebetween and movement of the induction heating unit relative to the RF power generator was not easily possible.

Accordingly, it is an object of this invention to provide a circuit which insures that a predetermined amount of energy is absorbed by a workpiece being heated by induction heating methods.

Still another object of this invention is to provide an induction heating unit which is capable of detecting the precise amount of wattseconds delivered by the induction heating element to the load so that the temperature generated in localized areas of large bodies of sheet metal can be precisely controlled.

Accordingly, many other objects, features and advantages of this invention will be more fully realized and understood from the following detailed description when taken in conjunction with the accompanying drawings wherein like reference numerals throughout the various views of the drawings are intended to designate similar elements or components.

DETAILED DESCRIPTION OF THE ILLUSTRATED EMBODIMENT

Figures 1, 2:
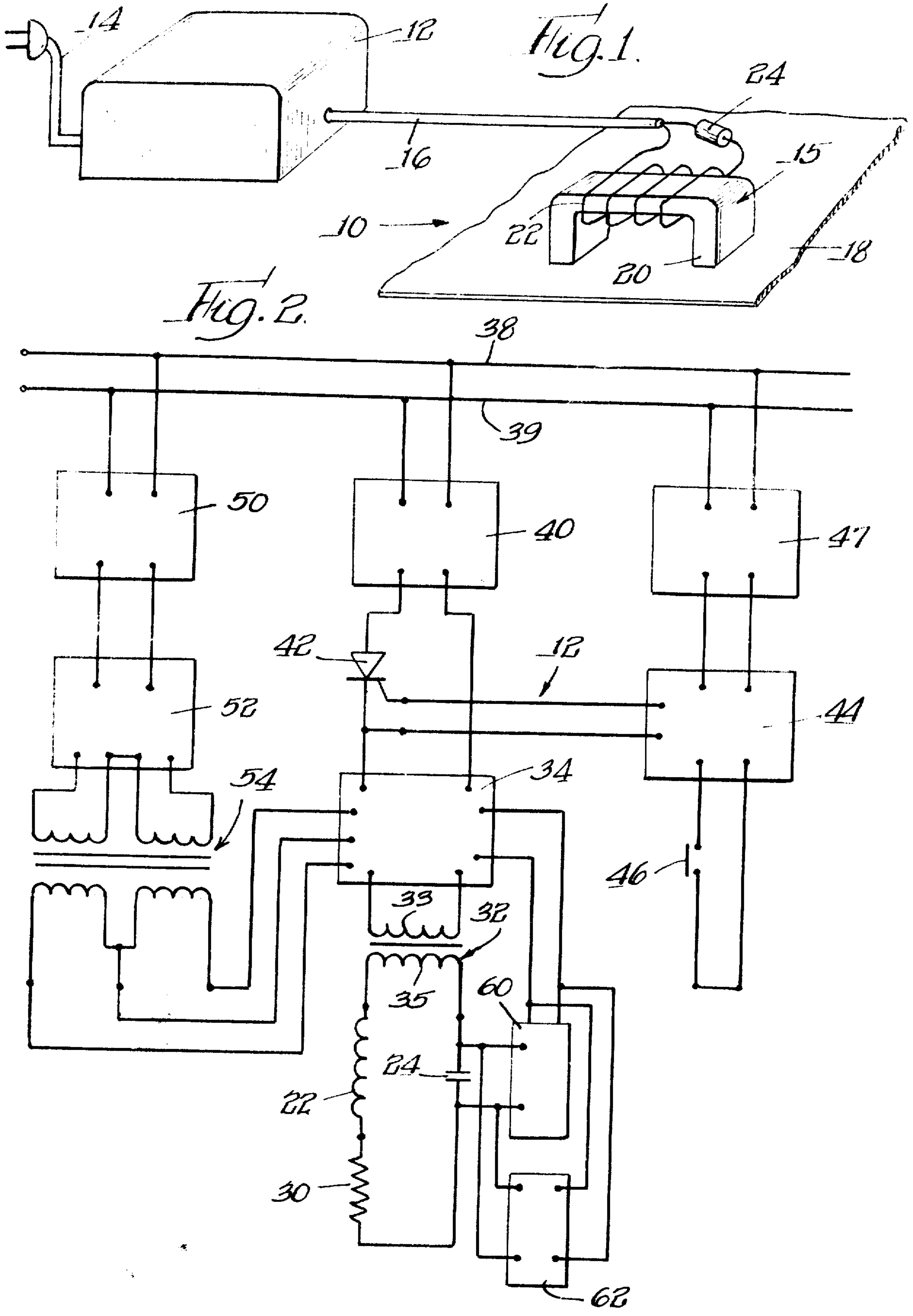
FIG. 1 is a simplified block diagram showing the basic construction of the induction heating system of this invention.
FIG. 2 is a detailed partially block and partially schematic diagram of the induction heating system of this invention.

Referring now to FIG. 1 there is seen an induction heating apparatus constructed in accordance with the principles of this invention and is designated generally by reference numeral 10. The induction heating apparatus 10 includes a remotely located alternating current generator source 12 connected to conventional AC energizing power by means of a cable 14. The generator 12 delivers alternating current voltage of an operating frequency to an induction heating unit 15, this frequency being in the order of eight to ten kiloHertz. The induction heating unit 15 receives energizing frequency over a multiconductor cable 16 so that a relatively well-defined area on a large sheet of metal 18 can be heated. The sheet metal 18 may correspond to such things as the sheet metal on automobiles or the like.

The induction heating unit 15 includes a U-shaped, or horseshoe, type applicator or heat transfer core member 20 which has the central portion thereof wrapped by the exciter coil 22. Connected in current series relation with the exciter coil 22 is a capacitor 24. Capacitor 24 forms a series resonant circuit with the inductance element 22 and its value is so selected that its resonant frequency is close to the operating frequency of the apparatus. The generator 12 includes means for presetably selecting the frequency at the output thereof so that substantial coincidence between the output or operating frequency and the resonance frequency of the series combination of elements 22 and 24 is at all times obtained. This then insures maximum efficiency of energy transfer between the generator 12 and the induction heating unit 15. By so providing a series tuned induction heating unit, the length of the cable 16 can be varied and the relative position of the induction heating unit 15 relative to the generator 12 can be changed.

Referring now to FIG. 2 the detailed block diagram and schematic circuitry of the induction heating generator of this invention is illustrated. The coil 22 of the induction unit 15 is shown as being connected in series with a resistor 30 and the capacitor 24. The resistor 30 represents the internal resistance of the circuit as obtained by the reflected losses generated in the load during induction heating. The primary winding 33 of output transformer 32 is energized by an inverter circuit 34, and the secondary winding 35 thereof energizes the series combination of inductance element 22 and the capacitor 24. The total inductance and capacitance of the series combination of element 22 and capacitor 24 comprise a resonant tuned circuit which is resonant or close to resonance at an operating frequency and does represent, together with resistance 30 referred to the series circuit the load for secondary winding 35.

Energizing current for the induction heating system, including generator 12, is obtained by a pair of lines 38 and 39 which are connected to a conventional source of alternating current voltage operated at 60 Hz. Power transfer means 40 are interposed between the lines 38 and 39 and the inverter circuit 24 to provide direct current energy to the inverter. The direct current energy is obtained by a full wave rectifier circuit arrangement of the power transfer means 40 which is completely void of filter capacitors so that at each half cycle of the applied alternating current voltage there is a zero voltage condition. This zero voltage condition is utilized to render a silicon controlled rectifier 42 nonconductive whenever the gate electrode thereof is free of a gating pulse.

The gate-emitter terminals of silicon controlled rectifier 42 are coupled to a gate controlled timing circuit 44 which is operatively energized by means of a switch 46 to initiate operation of the induction heating system. The gate controlled timing circuit 44 is powered by means of a DC full wave rectifier circuit 47 which may or may not be filtered to eliminate ripple.

Another full-wave DC rectifier circuit 50 is connected to the lines 38 and 39 and it supplies DC current to a variable frequency signal generator 52 which has a double winding primary transformer 54 connected to the output terminals thereof. The transformer 54 includes double winding secondary means coupled to the inverter circuit 34 for controlling operation of the inverter. The operating frequency of the inverter as determined by the signal generator 12 is in the order of 8 to 10 thousand Hertz. However, since the inverter circuit 34 is rendered inoperative during each zero crossing of the applied 60 Hertz power line, the time of operation can be controlled to within one one hundred and twentieth of a second.

While the capacitor 24 is shown as a fixed capacitor it will be understood that it can be a variable capacitor or a bank of capacitors switchably selected so as to be at all times in series resonance at the operating frequency. The frequency of the signal generator 52 and the frequency of the resonant tuned circuit formed by the inductance element 22 and capacitor 24 are selected to provide maximum efficiency of energy transfer between the output transformer 32 of the inverter 34 and the inductance element 22. Once the proper frequency of operation is selected, the inductance apparatus of this invention will provide a multitude of repeated operations having the same amount of energy transferred into the sheet metal sheet 18, FIG. 1. Readjustment of the frequency of operation or of the resonance characteristic of the tuned circuit is only necessary upon substantial changes in operating characteristics, i.e. either different metal thicknesses being heated or longer cables 16 being used.

To insure that the exact amount of energy is absorbed by the workpiece, means to terminate operation of the induction heating apparatus is provided. This means takes the form of a wattsecond sensing circuit 60 having an input thereof coupled across the capacitor 24 and an output thereof coupled to input terminals of the inverter 34. The output of the wattsecond sensing circuit will render the inverter circuit 34 inoperative when the desired amount of energy has been transferred into the workpiece.

An over voltage control circuit 62 is also coupled across capacitor 24 and has output terminals thereof connected to the input of inverter 34. The over voltage control circuit 62 senses the voltage value developed across capacitor 24 and, should this voltage value exceed a predetermined maximum value as set by a reference voltage it will generate a turn-off signal to disable the inverter circuit 34. Although the wattsecond control circuit 60 and the other voltage circuit 62 are shown as being coupled across the capacitor 24, it will be understood that they can be coupled across the inductance element 22 with equal efficiency.

Figures 3, 4:
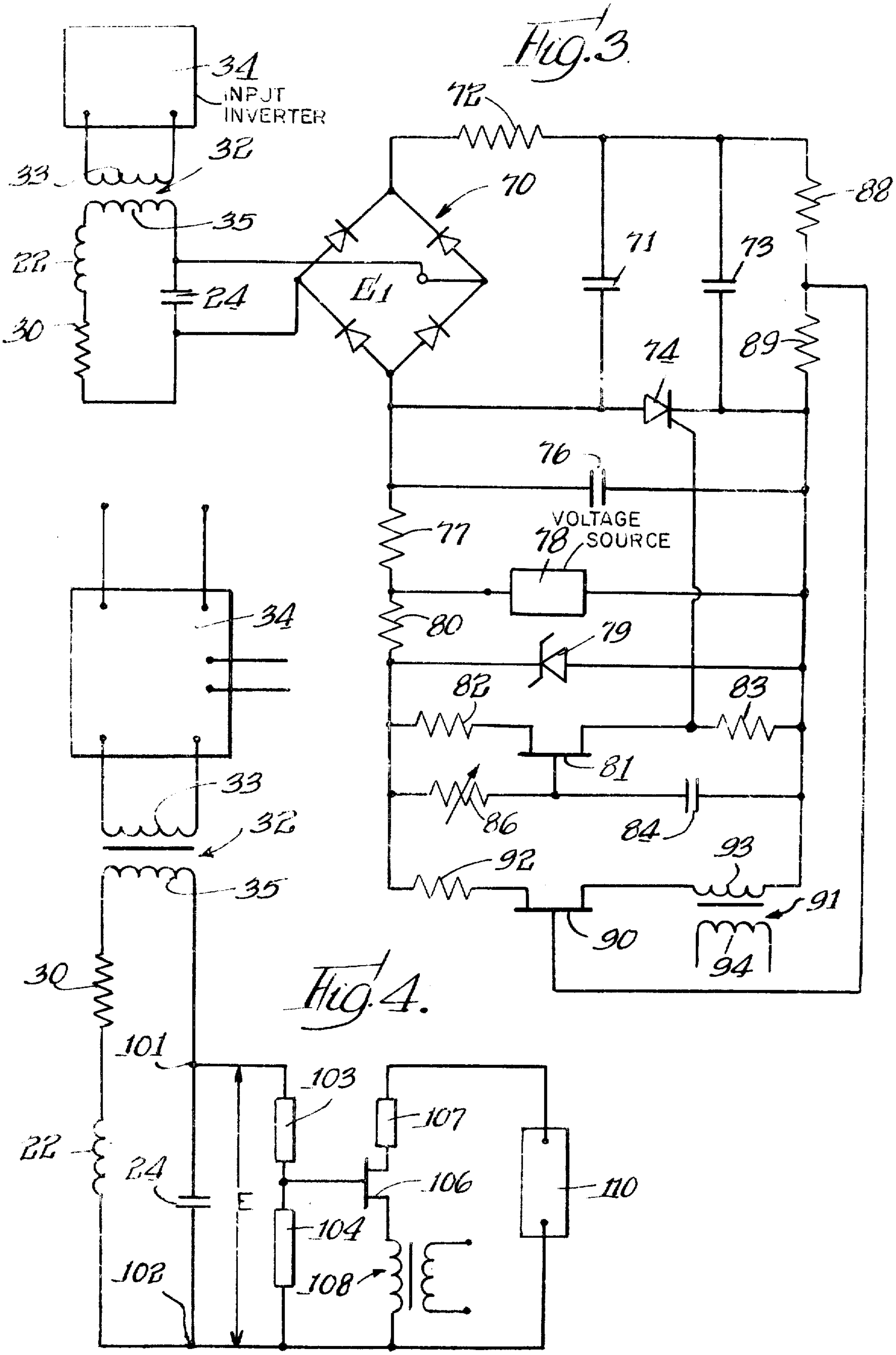
FIG. 3 is a detailed schematic diagram of the wattsecond control circuit of this invention.
FIG. 4 is a detailed schematic diagram of the over voltage sensing circuit of this invention.

For a better understanding of the wattsecond control circuit of this invention, reference is now made to FIG. 3 which is a detailed schematic showing thereof. The wattsecond meter of this invention is utilized with the induction heating apparatus so that precise quantities of heat can be absorbed by the workpiece time after time so that consistency of operation is obtained. For example, for a given material of given dimensions with similar electrical and thermal characteristics, the temperature reached at any time as the result of the application of induction heating is sufficiently approximated to be proportional to the product of the power applied and the time of exposure. If it can be assumed that the power input remains the same for all similar conditions of operation, then the sole requirement to obtain a given predetermined temperature is to operate the induction heating unit for an exact period of time, which can be measured by any one of the well-known timing circuits. In the absence of a constant input voltage, which is most likely the case, a given time period will not produce the necessary constant temperature because the total watts input will be different. This means that if the power line input varies, so also will the end result temperature of the workpiece.

There are several means to obtain a constant voltage input to the induction heating apparatus of this invention. However, such known means, such as for example constant voltage transformers or the like, are relatively large and expensive. Also, the use of temperature measuring devices at the surface of the workpiece being heated is cumbersome and because of the constant repeated exposure to temperature is subject to excessive wear. The wattsecond control circuit of this invention overcomes these problems and, at the same time, provides means for the economical control of the induction heating apparatus.

The basic concept of the wattsecond control circuit is based on the comparison of a charge on a pair of capacitive elements of different value. The principle of charge comparison is used for the purpose of measuring the quantity of electric energy over a period of time so that the Wattsecond product can be determined. The charge Q on a capacitor of value C is directly proportional to the product CV, where V is the charging voltage. The smaller capacitor of the 2 capacitive elements of different value is initially charged to a voltage $V_0$ and then this charge transferred to a larger capacitor. If the large capacitor is n times larger than the smaller one, the charge Q deposited on the smaller capacitor will have to be deposited n times on the large capacitor in order to obtain the same voltage $V_0$ as initially existed on the smaller capacitor. If the charge transferred from the smaller to the larger capacitor always takes place within the same time interval, then the charge deposited on the larger capacitor will be a measure of the Wattseconds measured by the smaller capacitor, or if the charging voltage of the smaller capacitor can be made proportional to power, then it will be a measure of the Wattseconds accumulated during a certain time period. If only a fraction m of the total voltage made available on the larger capacitor is to be used for control purposes, then a charge $q_1 = qn/m$ will have to be deposited on the larger capacitor.

Referring now to FIG. 3 of the drawings, the general arrangement of the wattsecond circuitry is illustrated. The applied voltage to the circuit is obtained from the resonant tuned circuit comprising inductance element 22 and capacitance element 24, as shown in FIG. 2. This alternating current voltage is applied to the AC input terminals of a bridge rectifier circuit 70 which rectifies this voltage and applies it to a first capacitor 71 through a resistor 72. The source voltage applied to the AC input of bridge rectifier 70 is represented by $E_1$ and is proportional to the voltage applied to the induction heating unit. This voltage will vary with variations in line voltage. The charging of capacitor 71 by the rectifier system is determined by the time constant $t_1$, corresponding to the product of the resistance of resistor 72 and the capacity of capacitor 71.

A second capacitor 73 is connected across capacitor 71 but only electrically coupled thereto upon conduction of a silicon controlled rectifier 74. Capacitor 73 is many times larger than capacitor 71. Between capacitor 73 and capacitor 71 is the low resistance afforded by the silicon controlled rectifier 74, when conductive. As long as silicon controlled rectifier 74 is maintained in the nonconductive state, capacitor 73 is disconnected from the circuit and receives no charge. Therefore, capacitor 71 receives the entire charge from the bridge rectifier 70 and will charge to a value $E_1$. As soon as the gate electrode of silicon controlled rectifier 74 is supplied with a trigger voltage the silicon controlled rectifier will switchably become conductive to transfer the charge on capacitor 71 to capacitor 73. If the duration of the conductive state of silicon controlled rectifier 74 is sufficiently short, then the charge accumulated on capacitor 71 will be transferred practically entirely to capacitor 73 thereby raising the voltage across the terminals of the capacitor as a function of the value of the charge applied thereto. The time constant of the capacitor 73 is determined only by the resistance obtained when silicon controlled rectifier 74 is conductive, this being a relatively low value. Most advantageously, the time constant of capacitor 71 and resistor 72 is larger than the time constant of capacitor 73 and internal resistance of silicon controlled rectifier 74. The time period of conduction of silicon controlled rectifier 74 can be made short by a simple expedient of supplying its discharge energy from a capacitor 76 which is charged through a resistor 77 from a separate voltage source 78. Capacitor 76 then commutates silicon controlled rectifier 74 to the off condition. If capacitor 76 is small enough and resistor 77 is large enough, then the silicon controlled rectifier 74 will reach a nonconductive state in a very short period of time, this being the result of the time constant between these two components.

The DC source 78 is connected to a zener diode 79 through a resistor 80. The regulated voltage developed across zener diode 79 is used to energize a unijunction transistor 81 which has resistance elements 82 and 83 connected in series with the base electrodes thereof. Connected to the emitter electrode of unijunction transistor 71 is a charging capacitor 84 in series with a variable resistance element 86. Unijunction transistor 81 together with its associated components form a relaxation type oscillator used as a timing circuit. The output pulses available across resistor 83 apply triggering pulses to the gate electrode of silicon controlled rectifier 74, thus providing conductive periods thereof at a frequency determined by the time constant of capacitor 84 and variable resistance element 86. The time constant is selected relatively large in comparison to the time constant provided for by capacitor 71 and resistor 72. A pair of resistors 88 and 89 connected in series combination across capacitor 73 is chosen with appropriate values to permit the required triggering voltage to be applied to the emitter of unijunction transistor 90. The value of the series combination of resistors 88 and 89 is sufficiently large so as to prevent premature leakage of the charge on capacitor 73, thereby requiring a plurality of conduction periods of silicone controlled rectifier 74 to transfer the charge to capacitor 73. Once a sufficient voltage level is arrived at across the terminals of capacitor 73, the voltage appearing across the resistor 89 is applied to the emitter electrode of unijunction transistor 90 to render it conductive and produce an output pulse across a pulse forming transformer 91. The unijunction transistor 90 is connected in series with a resistor 92 and the primary winding 93 of pulse transformer 91. The secondary winding 94 of the transformer is then coupled back to the input terminals of the inverter 34, as shown in FIG. 2, to disable the inverter at the precise time when the desired number of Wattseconds is obtained.

In operation, the wattsecond control circuit is energized by a portion of the alternating current voltage developed within the induction heating unit. As soon as the proper voltage is developed across capacitor 73, this voltage will transmit a pulse signal to the base electrode of transistor 90 which, in turn, generates a turn-off signal at the output winding of the pulse transformer 91. The voltage available at the terminals of resistor 89 or, for that matter, across the terminals of capacitor 73, is with a very close approximation directly proportional to the total amount of wattseconds developed within the induction heating unit. Therefore, the total amount of energy delivered to the workpiece to be heated, which is represented by the resistance 30, FIG. 2, is accurately controlled.

In the illustrated embodiment of voltage $E_1$ developed across the bridge circuit 70 may have a peak value of about 200 volts or higher, thus being adequately sufficient to operate the wattsecond control circuit.

The following component values are given by way of example, and not by way of limitation. The resistor 72 is 100 k ohms, capacitor 71 is 0.01 microfarads. These two components form a time constant of one millisecond. Capacitor 73 is 0.1 microfarads and the silicon controlled rectifier 74 is of the type commonly referred to as C35 capable of operating at 250 volts and having an internal resistance, when conductive, of approximately two ohms. The capacitor 84 is in the order of one microfarad and resistance element 82 is approximately 10 k ohms, thus corresponding to a time constant of 10 milliseconds. The time constant provided for by the silicon controlled rectifier 74 and capacitor 73 is very short since the resistance of the silicon controlled rectifier is very small.

For a better understanding of the over voltage control circuit, reference is now made to FIG. 4. As mentioned above, the primary function of the over voltage control circuit is to limit the voltage value applied across certain electronic components. For example, the capacitor 24 has a maximum operating voltage characteristic which, if exceeded, would cause damage thereto. Also various solid state devices within the circuit may be damaged by extreme voltage conditions. The voltages impressed upon such components of an electrical or electronic circuit may depend upon conditions not necessarily inherent in the circuit itself, but rather by changes in such things as material constants, temperature variations, and the like. These changes influence the characteristic elements or devices to which the particular electronic circuit is applied.

One characteristic example is the control of voltages appearing across the tuning elements in a resonant circuit, which might be either a series or a parallel resonant circuit. Depending on the losses associated with the components at a particular frequency the voltage developed across the capacitance and inductance, at resonance, will reach a relatively high value. The voltage off resonance on either side may be relatively low, but at resonance extreme high voltage conditions can occur across the electronic components. It is customary to express the expected voltage ratio between maximum and minimum voltages by the Q of the circuit. The higher the Q the higher the voltage will be under resonant conditions in comparison to the voltage across the elements when the frequency is off resonance or when there is a low Q.

It is the primary function of the over voltage control circuit to detect voltages exceeding a certain predetermined value across any one of the circuit elements of the electronic circuit, preferably one of the resonant elements of the tuned circuit, and terminate operation of the induction heating unit when such over voltage condition exists.

The circuit arrangement shown in FIG. 4 comprises a pair of input terminals 101 and 102 connected across the capacitor 24 thereby applying a voltage divider network comprising resistors 103 and 104 thereacross. The juncture between resistors 103 and 104 is connected to the emitter electrode of a unijunction transistor 106 which, in turn, has the base electrodes thereof connected to a resistor 107 and the primary winding of a pulse transformer 108. A reference potential source 110 is connected across the base electrodes of the unijunction transistor 106 to provide a reference potential to be compared with the voltage developed at the emitter thereof as received from the capacitor 24. When the maximum value of voltage is sensed across the capacitor unijunction transistor 106 is rendered conductive to develop a pulse signal in the pulse transformer 108. This pulse signal is then applied to the input terminals of the inverter circuit 34, FIG. 2, as mentioned above to terminate operation of the circuit.

Accordingly, this invention provides a simple and effective inductance heating means for applying heat to localized areas on such things as sheet metal surfaces. Also the control circuit of this invention includes wattsecond control means and over voltage control means to provide accurate operation thereof. While specific embodiments of the various aspects of the invention have been disclosed, it will be understood that variations and modifications thereof may be effected without departing from the spirit and scope of the novel concepts disclosed and claimed herein.

The invention is claimed as follows:

1. A wattsecond sensing means including a rectifier circuit coupled to an impedance element, a first capacitor coupled to said rectifier means, a second capacitor coupled to said first capacitor, a silicon controlled rectifier switch means coupled between said first and second capacitors control means coupled to said silicon controlled rectifier for periodically energizing and deenergizing said silicon controlled rectifier for transferring electric charge from said first capacitor to said second capacitor, and pulse means coupled to said second capacitor to develop a signal pulse indicating the accumulation of a predetermined wattsecond magnitude.

2. A wattsecond sensing means in accordance with claim 1 wherein said first capacitor has a different value than said second capacitor.

3. A wattsecond sensing means in accordance with claim 2 wherein the second capacitor is of a value many times greater than the value of the first capacitor.

* * * * *